Sept. 13, 1938.    G. A. HORMEL    2,130,237
METHOD OF DEFROSTING MEAT
Original Filed May 19, 1937
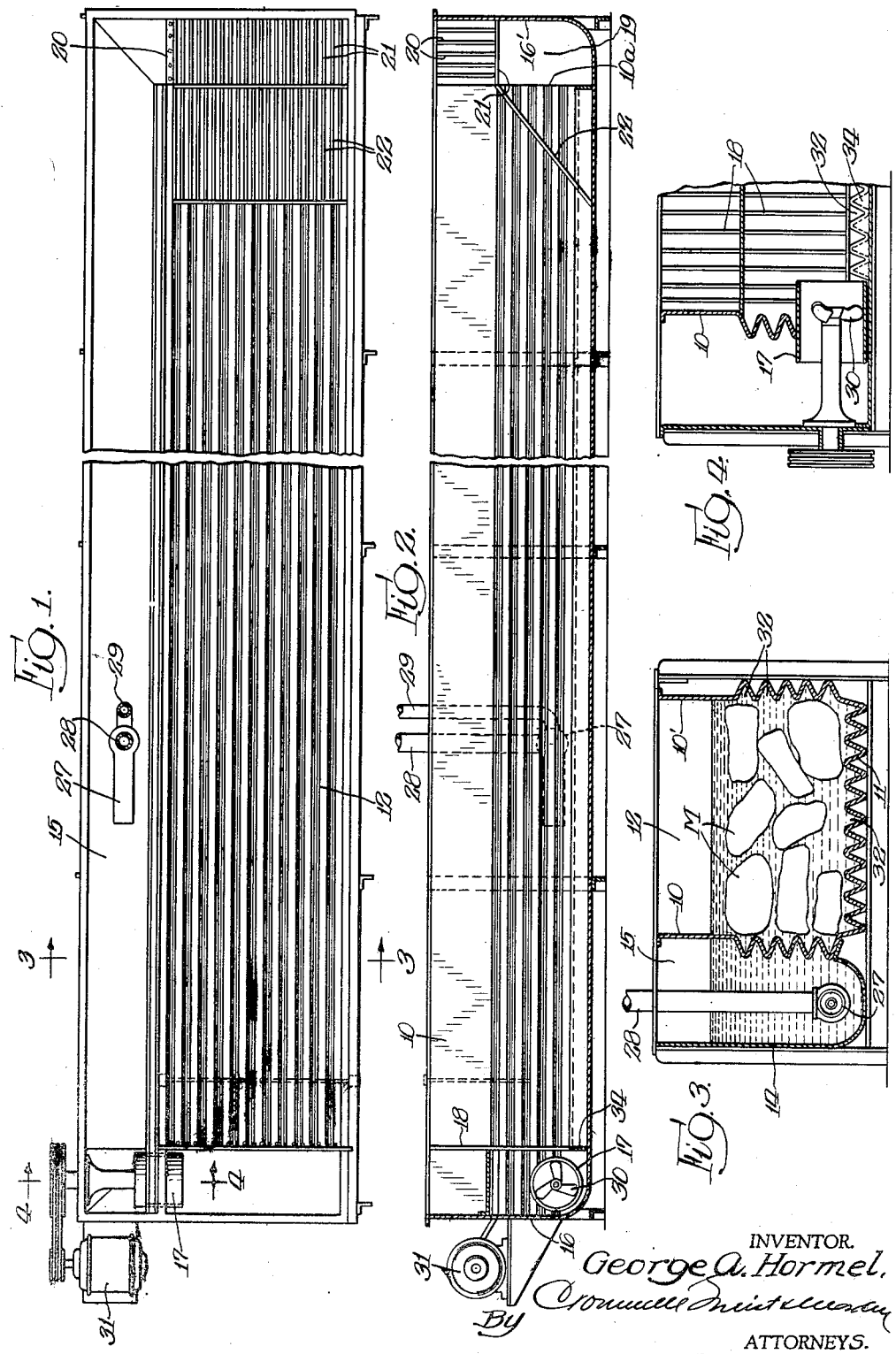
INVENTOR.
George A. Hormel.
BY
ATTORNEYS.

Patented Sept. 13, 1938

2,130,237

UNITED STATES PATENT OFFICE 2,130,237

METHOD OF DEFROSTING MEAT

George A. Hormel, Los Angeles, Calif., assignor to Geo. A. Hormel & Company, Austin, Minn., a corporation of Delaware Original application May 19, 1937, Serial No. 143,423. Divided and this application July 1, 1938, Serial No. 216,871

4 Claims. (Cl. 99—194)

The proper curing of meat, such as the curing of hams, bacon, and the like, by pickling, smoking, etc., requires a considerable period of time, and cannot be completed as rapidly as the animals can be slaughtered and the various parts dressed suitably for curing. Whereas curing may be carried on continuously throughout the year, the slaughtering of animals is of seasonal occurrence. For example, hogs normally are ready for the market and are sold to packers during only certain seasons, and it is desirable, from the standpoint of economy and for the purpose of obtaining the best quality in the finished product, to slaughter and dress them promptly. Consequently, during the slaughtering periods, the dressed meat is placed in cold storage, where it is frozen for preservation, and this cold storage stock is drawn upon throughout the balance of the year to supply the requirements for curing.

Since the meat in cold storage is kept in a frozen condition, it is necessary to thaw or defrost it before it is subjected to the curing treatments. Such defrosting heretofore has usually been accomplished by spreading the frozen meat in a heated room until it thaws, or by soaking it in vats of heated water. Defrosting by such procedures is slow, exposes the meat to bacterial action, and affects it deleteriously in various other ways.

The general object of the present invention is the provision of a method for the defrosting of meat and the like whereby the thawing may be accomplished rapidly and completely with a minimum of handling and with minimum injury to its character and quality.

Another object is the provision of such a method which requires minimum space and time for the defrosting of large quantities of meat, by virtue of the fact that the procedure is of a continuous character, as distinguished from a batch treatment.

Another object is the provision of such a continuous method whereby the respective pieces of meat may be treated uniformly, as distinguished from some being overtreated while others are undertreated.

Other and further objects of the invention will be pointed out or indicated hereinafter or will be apparent to one skilled in the art upon an understanding of the invention or its employment in use.

The present application constitutes a division of my copending application Serial No. 143,423, filed May 19, 1937.

For the purpose of aiding in an explanation of the invention, I show in the accompanying drawing forming a part of this specification one form of apparatus which, as hereinafter described, may be used in the practicing of the method. It is to be understood, however, that the method may be performed by other means.

In said drawing,

Fig. 1 is a shortened top or plan view of a defrosting apparatus by means of which the method constituting my invention may be practiced;

Fig. 2 is a longitudinal vertical sectional view of same;

Fig. 3 is a transverse sectional view of same on approximately line 3—3 of Fig. 1 but on a larger scale; and Fig. 4 is a part transverse sectional view of same on approximately line 4—4 of Fig. 1.

In general, the method constituting the present invention is designed to accomplish the thawing, or defrosting, of pieces of meat or the like very rapidly and as a continuous or line procedure. It may be practiced by placing the pieces of frozen meat in a body of circulating liquid which, in the course of its circulation, is maintained at a suitable temperature above that of the frozen meat, as by addition of heat to the liquid continuously or when necessary, circulating the liquid at such a rate in a guided or directed path, as to cause it to carry the pieces of meat along in its current from the place where they were put into it to a station where they are to be removed from it, but retarding the progress or travel of the pieces to a rate slower than the progressive movement of the liquid current, so that the cooled liquid is carried away from them. Heat is supplied to the cooled liquid at a place apart from the meat, and then the liquid is energetically stirred, so as to equalize the diffusion of the heat in it, and the reheated liquid is again propelled away and past the pieces of meat. Consequently, while the pieces of meat remain in the liquid, they are continuously bathed in liquid at an elevated temperature. As a consequence of this procedure the various pieces are subjected to uniform treatment and the defrosting or thawing is accomplished very rapidly so that the meat is not subjected to soaking in such a fashion as to become waterlogged. The progressive movement of the pieces of meat may be retarded by their rubbing against each other and the walls of the receptacle or conduit in which they and the liquid are contained or by contact with one another or by obstruction offered by pieces ahead of them which may be stopped at the discharge station. However, even though the progress of the pieces of meat may at times be actually stopped, the progressive movement of the liquid is maintained continuously and at such a rate as to produce turbulence of the liquid between the various pieces, in order that there shall be no pocketing of cold liquid among them.

By way of a specific example of the manner in which the method may be carried on, I shall describe the procedure as practiced by means of an apparatus shown in the accompanying drawing, and as a preliminary will describe the construction of that apparatus.

The reference characters 10 and 10' designate the side walls and 11 the bottom wall of a long trough-like structure which forms the treating compartment 12. The reference character 14 designates the outer side wall of the return flow compartment 15 which extends alongside the treating compartment 12 and is separated therefrom by the wall 10. End walls 16 and 16' connect the side walls 14 and 10' and form the ends of the tank. This tank may be of any desired length, e. g., 50 to 60 feet, and the treating compartment 12 of sufficient depth and width to accommodate three or four hams one beside another or one below another. The end of the tank closed by the end wall 16 is the charging end, and that closed by the wall 16' is the discharge end.

At the charging end, a sleeve 17 is mounted in an aperture in the lower portion of the wall 16 and forms a communication between the treating compartment 12 and the return flow compartment 15. Adjacent the side of the sleeve opposite the wall 16 a grating 18 is interposed across the end of the treating compartment 12. The wall 10 terminates at 10a at a distance from the end wall 16', leaving an aperture 19 which affords communication between the treating compartment 12 and the return flow compartment 15. This aperture 19 is screened off from the treating compartment by a grating comprising a vertical portion 20 across the upper part of the aperture, a horizontal portion 21 across the discharge end of the compartment 12, and a sloping portion 22 which extends down from the horizontal portion 21 to the bottom wall of the treating compartment.

In the bottom of the return flow compartment 15 is disposed the nozzle or outlet 27 of equipment for supplying water and steam, the water supply pipe being illustrated at 28 and the steam supply pipe at 29. This nozzle forms a mixing and injecting device whereby water introduced thereinto is heated by steam injected into it, and the heated water directed into the charging end of the tank.

In the sleeve 17 is positioned an impeller 30, which is arranged to be suitably driven as by a motor 31.

The side walls 10 and 10' and bottom wall 11 of the treating compartment are corrugated or otherwise formed or fitted to provide a plurality of relatively narrow channels 32 extending longitudinally of and in communication with said compartment. The channels in the bottom wall 11 terminate somewhat short of the end walls 16 and 16', and the spaces between the inwardly opening channels are closed at their ends by suitably shaped plates 34 or in other appropriate fashion. While in the embodiment illustrated the channels 32 are shown in the form of corrugations in the sheet metal walls 10, 10' and 11, it will be understood that they may be formed in various other ways.

In the practicing of the method by means of this apparatus, the treating compartment and return flow compartment 15 are filled to a suitable depth with water which is introduced by the line 18 and heated to a suitable temperature in the mixing and injecting device 27 by steam introduced through the line 29. The impeller 30 is suitably actuated to propel water from the compartment 15 through the sleeve 17 and into the charging end of the compartment 12. As a result, the water is caused to flow longitudinally in the treating compartment from its charging end to its discharge end, from which it passes into the return flow compartment 15 through the aperture 19. The pieces of frozen meat, for example, the green hams, belly pieces for bacon, and the like, are charged into the compartment 12 adjacent the grating 18. While their specific gravity may be such that they sink, they have enough buoyancy to permit their being propelled along toward the discharge end of the tank by the current induced by the impeller 30. The treating compartment is thus charged with pieces of frozen meat in sufficient number to occupy it from side to side and to the desired depth, with a suitable depth of water over the topmost pieces, somewhat as illustrated in Fig. 3, wherein the pieces of meat are designated M. The pieces of meat are carried along by the flow or current of water maintained in the treating compartment so that they gradually progress toward the discharge end, where the foremost pieces are stopped by the grating 22. Due to the fact that some of the pieces rub against the sides and bottom of the tank, and others rub against these and against one another, in a more or less jumbled relationship, the progress of the pieces is considerably retarded relative to the rate at which the water flows, and as a consequence, as they thus progress they are completely bathed by the heated water which flows in contact with and past them continuously at a considerably greater speed than they themselves travel. When the treating compartment is fully charged and the operation going on as above described, it is kept filled to the proper depth with pieces of meat from end to end. Of course, due to their buoyancy and irregular shapes, the pieces of meat do not pack tightly, although they occupy the greater proportion of the submerged space. With the tank thus charged the pieces of meat would very appreciably retard the flow of the water, and would tend more or less to dam up the hot water toward the charging end of the tank, were it not for the flow channels 32. These afford continuous unobstructed spaces through which the hot water may flow rapidly along the sides and bottom of the treating compartment throughout its entire length, and the rapid flow thus afforded by these channels has the effect of imparting turbulence and impulse to the water which is among the pieces of meat, thus distributing the hot water throughout the volume of the compartment and maintaining a proper flow to carry the cooled water along to the discharge end.

After leaving the treating compartment through the opening 19, the cooled water flows to the device 27, where hot steam is injected into it. Then proceeding to the impeller sleeve 17, it is energetically stirred by the impeller, so that an equalized distribution of the heat in the water is obtained. The action of the impeller tends to build up a heat at the charging end of the treating compartment, with the result that the reheated water is given a flow velocity toward the discharge end and is caused to re-circulate past and among the pieces of meat. As a result, the pieces of meat are defrosted very rapidly, as each piece is being continuously contacted by hot water and the cooled water is continuously moving on away from it. Accordingly, by the time a piece of meat has reached the grating 22, it is substantially defrosted and if not completely so, may be left in the tank until it is in proper condition. Thereupon it is withdrawn upon the grating 21 and removed from the tank. Since the progress of those behind is in part dependent on the progress of those ahead, the time in which the pieces remain in the liquid may be controlled rather definitely by the rate at which they are removed at the discharge end. Consequently, a definite control at all times may be exercised as to the period in which the pieces are contacted with liquid. Said period may be shortened by increasing the speed of the impeller 30 and removing the pieces as quickly as they reach the discharge station, or prolonged in a converse manner. The temperature of the water may be controlled by the rate at which steam is supplied to the heating device 29.

Accordingly, by heating the water to the proper temperature and circulating it at the proper rate, the procedure may be carried on in such fashion that the pieces may be removed at the discharge end of the tank practically as fast as they arrive there, and the frozen pieces may be put into the tank at the charging end as rapidly as there is space for them. Thus the procedure may be carried on as a continuous operation, thawed pieces being removed and frozen pieces being supplied at the same time.

It will be appreciated, accordingly, that by use of the apparatus and procedure above described, the pieces of meat may be defrosted completely and uniformly at a very rapid rate, the pieces being carried along to the place of discharge at the same time that they are being defrosted. Consequently, it is rendered unnecessary to subject smaller pieces to excessive soaking in water to give larger pieces the necessary time for complete defrosting.

What I claim is:

1. A method of defrosting meat which comprises immersing the pieces of meat in a body of hot water at a charging station, propelling the water to cause it to flow as a stream through and among the pieces of meat and move them progressively, directing the course of the water and meat to a discharge point while retarding the progress of the meat relative to that of the water, reheating the water after it has passed the discharge point and then propelling it again among the pieces of meat, and removing the pieces of meat from the water at the discharge point.

2. A continuous method for defrosting meat as specified in claim 1 and including also the steps of directing the flow of the water from the discharge point back to the charging station in a path separate from that of the meat and applying heat to the water in the course of such return before it reaches the charging station.

3. A method of defrosting meat which comprises immersing the pieces of meat in a free condition in a stream of heated liquid at a charging station, propelling the liquid and guiding it so as to cause it to circulate in a defined path or course, thereby transporting the pieces of meat to a discharge point, retarding the progress of the pieces of meat relative to that of the liquid, so that the liquid is caused to flow past and among the pieces of meat incident to their progressive movement, and removing the pieces of meat from the liquid at the discharge point.

4. A method as specified in claim 3 and including also the step of supplying hot steam to the circulating liquid at a point in its course between the discharge point and the charging station, and subjecting the liquid to energetic stirring between the locations in its course where the steam is supplied to it and the pieces of meat are deposited in it.

GEORGE A. HORMEL.